US007769787B2

(12) United States Patent
Hailpern et al.

(10) Patent No.: US 7,769,787 B2
(45) Date of Patent: Aug. 3, 2010

(54) METHOD AND SYSTEM FOR MAINTAINING ORIGINALITY-RELATED INFORMATION ABOUT ELEMENTS IN AN EDITABLE OBJECT

(75) Inventors: Brent Tzion Hailpern, Katonah, NY (US); Da Ming Hao, Beijing (CN); Lin Luo, Beijing (CN); Peter Kenneth Malkin, Ardsley, NY (US); Harold Ossher, South Salem, NY (US); Lawrence Scott Rich, Cary, NC (US); Dave Thomson, Ontario (CA); Zhong Tian, Beijing (CN); John Wiegand, Wilsonville, OR (US); Hang Jun Ye, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 11/780,583

(22) Filed: Jul. 20, 2007

(65) Prior Publication Data

US 2008/0021922 A1 Jan. 24, 2008

(30) Foreign Application Priority Data

Jul. 21, 2006 (CN) .................... 2006 1 0107724

(51) Int. Cl.
*G06F 7/00* (2006.01)
(52) U.S. Cl. .................... 707/803; 713/156; 713/187; 717/101; 717/110
(58) Field of Classification Search ............. 707/103 R, 707/999.009, 999.103, 803; 713/156, 187; 717/101, 110
See application file for complete search history.

(56) References Cited

U.S. PATENT DOCUMENTS

| 5,535,392 | A | | 7/1996 | Brett | |
|---|---|---|---|---|---|
| 5,574,898 | A | * | 11/1996 | Leblang et al. | 707/1 |
| 6,009,427 | A | * | 12/1999 | Wolff | 707/10 |
| 6,088,706 | A | * | 7/2000 | Hild | 707/202 |
| 6,091,896 | A | | 7/2000 | Curreri et al. | |
| 6,698,013 | B1 | | 2/2004 | Bertero et al. | |
| 7,330,830 | B1 | * | 2/2008 | Lamoureux et al. | 705/34 |
| 2002/0108106 | A1 | | 8/2002 | Kramskoy et al. | |
| 2003/0120593 | A1 | * | 6/2003 | Bansal et al. | 705/39 |
| 2004/0177343 | A1 | | 9/2004 | McVoy et al. | |
| 2005/0021689 | A1 | | 1/2005 | Marvin et al. | |

(Continued)

*Primary Examiner*—Hosain T Alam
*Assistant Examiner*—Jieying Tang
(74) *Attorney, Agent, or Firm*—Schmeiser, Olsen & Watts; William H. Steinberg

(57) ABSTRACT

A method and system for maintaining originality-related information about elements in an editable object. It is determined that an element has been edited in the editable object. The originality-related information about the element, including the element's creator, is identified and recorded by embedding the originality-related information in the editable object, storing the originality-related information in an attached file, or storing the originality-related information in association with the element in a repository configured to be shared by different editable objects and further configured to be queried for elements of the different editable objects in association with originality-related information pertaining to the elements of the different editable objects. Whether the element is in compliance with a policy relating to the originality-related information about the element is assessed, and a result of the assessing (indicating compliance or non-compliance of the element with the policy) may be transmitted to a user.

16 Claims, 9 Drawing Sheets

U.S. PATENT DOCUMENTS

| | | |
|---|---|---|
| 2005/0076331 A1 | 4/2005 | Das et al. |
| 2005/0108257 A1* | 5/2005 | Ishii et al. .................. 707/100 |
| 2005/0114287 A1* | 5/2005 | Hoberman .................... 707/1 |
| 2005/0187902 A1* | 8/2005 | Carpentier et al. ............. 707/1 |
| 2005/0193369 A1 | 9/2005 | Brumme et al. |
| 2005/0216528 A1* | 9/2005 | Cheng ....................... 707/202 |
| 2005/0262482 A1 | 11/2005 | Wagner et al. |
| 2006/0041837 A1 | 2/2006 | Amir et al. |

* cited by examiner

METHOD AND SYSTEM FOR MAINTAINING ORIGINALITY-RELATED INFORMATION ABOUT ELEMENTS IN AN EDITABLE OBJECT

FIELD OF THE INVENTION

The present invention relates to the field of data processing, and in particular, to a method and system for maintaining originality-related information about elements in an editable object.

BACKGROUND OF THE INVENTION

As collaboration among developers becomes more and more important and indispensable in the development of various kinds of projects, there has been an urgent need to overcome obstacles discouraging people from sharing and reusing what they have created in an effective way.

In the Open Source initiative, developers may contribute their program codes to the public, allowing anyone to incorporate, modify and distribute their codes for study or commercial purposes free of charge, with the aim of advancing technologies. While having achieved considerable success, the Open Source initiative has its own drawbacks which have hindered its further development. Firstly, the use of Open Source code always carries a high risk of code contamination, both in the form of bugs inadvertently created and in the form of virus or worms intentionally produced. Especially when a piece of code has been modified in multiple rounds by different people at different times after it was initially created, it is difficult to identify who is responsible for particular parts of the code and the risk of code contamination becomes even greater. Secondly, because of such a confused state of ownership of Open Source code where the developers' identities are not maintained and thus are not recognizable in the lifecycles of the codes created by them, they lack incentive to share their codes. Thirdly, in such a situation, a piece of code, once created and submitted, is out of the control of its creator, and is subject to any modifications made by anyone. Thus the maintenance (corrections, refinements, enhancements, etc) of the code by the original creator is impossible.

In the software development environment within an enterprise, when team members attempt to share their code in a single project or across projects, they will encounter similar problems which enhance the risk of code contamination, blur responsibilities, increase the difficulty of code maintenance, and make developers reluctant to share their code and use that from other developers. Moreover, in today's software development projects, developers are often required at the end of the production phase to sign a "Certificate of Originality" (COO) stating which parts of the code of the software are their own creation, and which parts are from the Open Source or some other sources; and due to the lack of an effective and reliable mechanism to maintain and track the originality-related information about pieces of code, this process will usually require 1-2 months to complete, which is both burdensome and costly. In addition, improperly maintained originality information about pieces of code can easily be lost during the transfer of people or intellectual assets.

Embedding comments in program source code can partly address the above issues; however, its deficiencies are also very obvious. Comment embedding is not a mechanism specially designed for maintaining originality-related information about source code. Further, whether or not comments are embedded in a piece of code and what any comments contain is entirely determined arbitrarily by the developers themselves. In a recent survey on developers' attitude towards embedding comments, more than half of the surveyed responded that they feel it was bothersome to add comments when writing code and in many times would neglect embedding comments, even if it would be convenient for the future maintenance of the code. In the collaborative development of software projects, a few developers' reluctance to embed comments would make comment embedding as a mechanism of maintaining originality-related information useless to a large extent. Apparently, comment embedding can hardly become an effective or feasible way of maintaining originality-related information about source code.

A SCM (Software Configuration Management, or source control) tool can record developers and revisions during check-in/check-outs in the development of a software project, but it still cannot solve the above issues, because it only maintains the code in a project-centric lifecycle. When the code goes out of a given SCM and is to be reused in some new project, it is difficult for the new team to retrieve the corresponding originality-related information from merely the snapshot of the code.

Thus, there is a need to overcome at least one of the preceding deficiencies and limitations of the prior art.

SUMMARY OF THE INVENTION

The present invention provides a method for maintaining originality-related information about elements in an editable object, said method comprising:

determining that an element has been edited in the editable object;

identifying the originality-related information about the element, wherein the originality-related information comprises the element's creator who originally wrote the element; and recording the originality-related information, said recording selected from the group consisting of embedding the originality-related information in the editable object, storing the originality-related information in an attached file, and storing the originality-related information in association with the element in a repository configured to be shared by different editable objects and further configured to be queried for elements of the different editable objects in association with originality-related information pertaining to the elements of the different editable objects.

The present invention provides a method of assessing compliance of an element in an editable object with a policy, said method comprising:

receiving a query for compliance of the element with the policy, wherein the policy relates to originality-related information about the element, and wherein the originality-related information about the element is being maintained in association with the element;

retrieving the originality-related information about the element maintained in association with the element, wherein the element has been edited in the editable object, wherein the originality-related information comprises the element's creator who originally wrote the element, and wherein said retrieving is selected from the group consisting of retrieving the originality-related information from the editable object in which the originality-related information is embedded, retrieving the originality-related information from an attached file, and retrieving the originality-related information in association with the element from a repository configured to be shared by different editable objects and configured to be queried for elements of the different editable objects in association with originality-related information pertaining to the different editable objects;

assessing whether the element is in compliance with the policy, said assessing based on the retrieved originality-related information about the element; and transmitting a result to a user based on said assessing, said result indicating compliance or non-compliance of the element with the policy.

The present invention advantageously overcomes at least one of the prevailing deficiencies and limitations of the prior art.

BRIEF DESCRIPTION OF THE DRAWINGS

The numerous advantages, features and characteristics of the present invention may be better understood by those skilled in the art by reference to the following detailed description of the embodiments of the invention when read in conjunction with the accompanying drawings; it being understood, however, that the present invention is not limited to the precise arrangements and instrumentalities as shown in the drawings.

DETAILED DESCRIPTION OF THE INVENTION

Figure 1A:
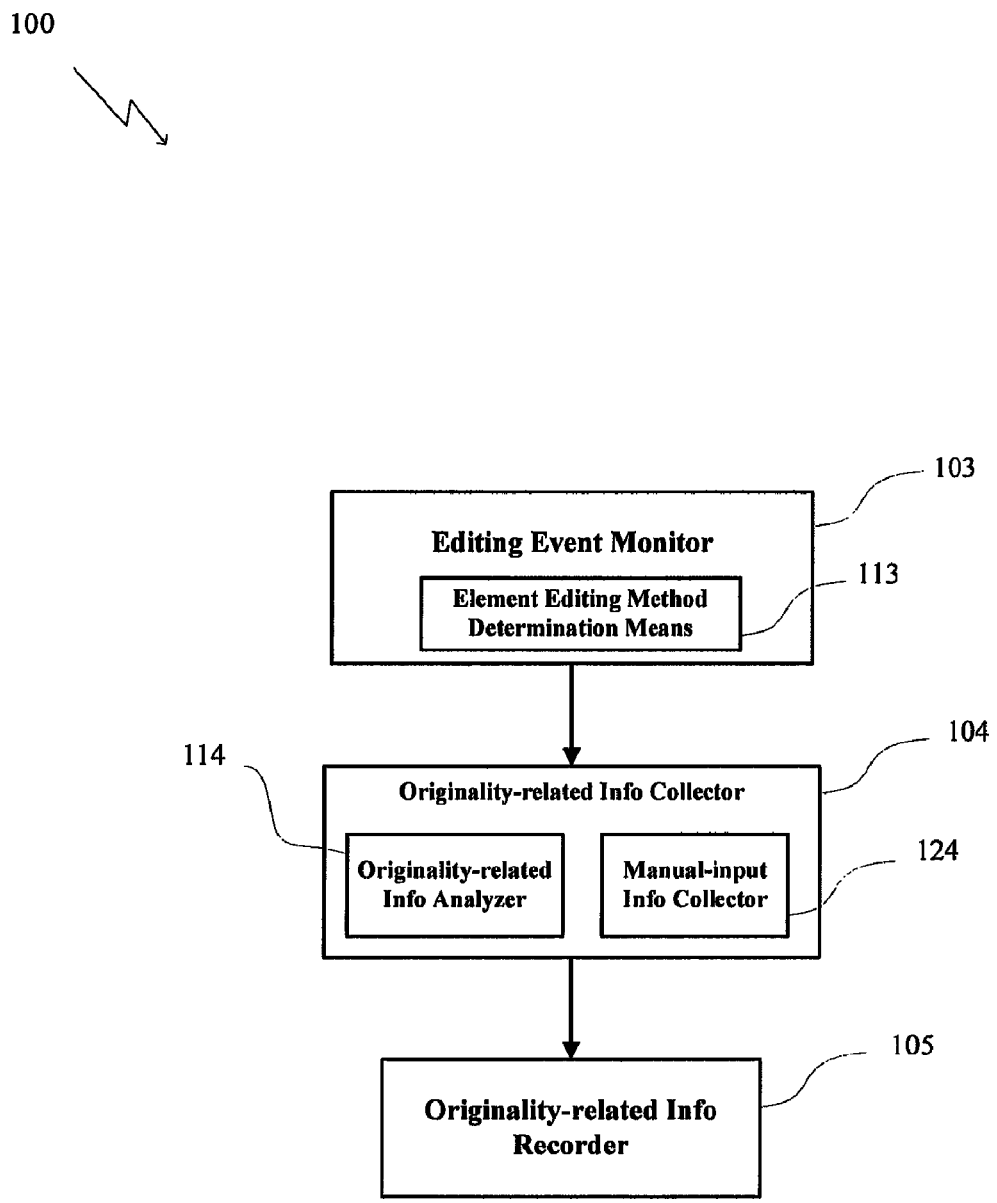
FIG. 1A is a schematic block diagram of a system for maintaining originality-related information about elements in an editable object in accordance with embodiments of the present invention.

The present invention reduces the risk of the reuse of elements in an editable object (e.g., a program code, a multimedia file, a database, etc.), facilitates element reuse and maintenance, ensures the development process compliance such as to Open Source usage and governance strategy, and facilitates project management such as Certificate of Originality (COO) by providing a method and system for properly tracking and maintaining the originality-related information about elements throughout their whole lifecycle.

The present invention associates the originality-related information of an element persistently with the element, and preserves this associated originality-related information in the future reuse and circulation of the element, the originality-related information including but not limited to the element's creator, owner, importer, origin, editing method, access rights, certificate of originality (e.g., usage rights), and relevant date and time information, etc. Thus it can be seen that the originality-related information of an element is not limited to the information related to the original creation or creator of the element, but rather can be any information produced during the reuse and circulation of the element. The integrity and non-repudiation of the originality-related information and its association with the element can thus be ensured. The association between the originality-related information and the element can be arbitrarily fine-grained because the element may be partly used.

In an aspect of the present invention, there is provided a method of maintaining the originality-related information about elements in an editable object, comprising the following steps: determining that an element has been edited in the editable object; identifying the originality-related information about the element; and maintaining the association between the originality-related information about the element and the element.

The originality-related information may comprise the element's creator and one or more of the following: the element's owner; the element's importer; the element's origin; the element's editing method; access rights to the element; certificate of originality of the element; and relevant date and time information.

The step of determining that an element has been edited in the editable object may further comprise determining the method by which the element has been edited in the editable object, wherein the method by which the element has been edited in the editable object may comprise any one of the following: inputting the element from the user editing the editable object; deleting an existing element; modifying an existing element; importing; reference; inheritance; and direct manipulation of the stored version of the editable object.

Said importing may comprise any one of copy-or-cut-and-pasting, inserting, and attaching.

The step of identifying the originality-related information about the element may comprises one or more of the following: automatically identifying the originality-related information about the element according to the method by which the element has been edited in the editable object; and obtaining the originality-related information about the element interactively from the user editing the editable object.

The step of automatically identifying the originality-related information about the element may comprise: obtaining the originality-related information about the element in the editable object by extracting the originality-related information already associated with the element and adding the user information of the user editing the editable object as the importer information and the importing operation information in the case that the element has been edited in the editable object by importing, reference, or inheritance; and obtaining the originality-related information about the element from the user information of the user editing the editable object and the editing operation information in the case that the element has been edited in the editable object by inputting the element from the user editing the editable object, deleting an existing element, modifying an existing element, or direct manipulation of the stored version of the editable object.

In the case that the element has been edited in the editable object by deleting an existing element, the existing element in the editable object was deleted by adding a new element the same as the existing element but with a negative sign, and the step of obtaining the originality-related information about the element from the user information of the user editing the editable object and the editing operation information comprises obtaining the originality-related information about said new element with a negative sign from the user information of the user editing the editable object and the deleting operation information; and in the case that the element has been edited in the editable object by modifying an existing element, the existing element in the editable object was modified by deleting the existing element in the above manner and then adding a new element with the modifications, and the step of obtaining the originality-related information about the element from the user information of the user editing the editable object and the editing operation information comprises obtaining the originality-related information about said new element with a negative sign and said new element with the modifications from the user information of the user editing the editable object and the modifying operation information.

Alternatively, in the case that the element has been edited in the editable object by deleting an existing element, the existing element in the editable object was deleted by marking the existing element as deleted, and the step of obtaining the originality-related information about the element from the user information of the user editing the editable object and the editing operation information comprises obtaining the originality-related information about the deleted element from the user information of the user editing the editable object and the deleting operation information; and in the case that the element has been edited in the editable object by modifying an existing element, the existing element in the editable object was modified by deleting parts of the existing element and/or adding parts into the existing element, and the step of obtaining the originality-related information about the element from the user information of the user editing the editable object and the editing operation information comprises treating said deleted and/or added parts of the existing element as new deleted and/or added elements, and obtaining the originality-related information about these new deleted elements in the manner as recited above in the case that the element has been edited in the editable object by deleting an existing element and/or obtaining the originality-related information about these new added elements in the manner as recited further above in the case that the element has been edited in the editable object by inputting from the user editing the editable object.

Te step of maintaining the association between the originality-related information about the element and the element may comprise embedding the originality-related information in the same editable object or storing the originality-related information in an attached file.

The step of maintaining the association between the originality-related information about the element and the element may comprise storing the originality-related information in association with the element in a repository (e.g., a database) configurable to be shared by different editable objects and users and configurable to be queried for elements and originality-related information in association. Said storing the originality-related information in association with the element means either storing both the originality-related information and the element in association in the repository, or when storing the originality-related information alone in the repository and storing the corresponding element in another repository or any other storing space, maintaining the association between the originality-related information and the corresponding element. Otherwise, during later querying, the correspondence between the originality-related information and the corresponding element could not be realized.

The step of maintaining the association between the originality-related information about the element and the element may comprise digitally signing "across" the association between the element and the originality-related information.

The step of maintaining the association between the originality-related information about the element and the element may comprise digitally signing "across" the association between the element and the originality-related information and the editable object.

The method of maintaining the originality-related information about elements in an editable object may further comprise authenticating the user editing the editable object.

The step of maintaining the association between the originality-related information about the element and the element may comprise preserving the association between the originality-related information about the element and the element when the element is reused in the future.

The method of maintaining the originality-related information about elements in an editable object may further comprise setting originality-related information based restrictions by the user editing the editable object, wherein notification/alerts are posted if one or more of the restrictions are violated when an element is edited in the editable object.

The editable object may be computer program code, and the element may be any one of a line, a function, a construct, a procedure, a subprogram, and a block of code as specified by the user.

The editable object is any one of a multimedia file and a database and the element may be a natural component thereof or any part thereof as specified by the user.

In another aspect of the present invention, there is provided a method of retrieving the originality-related information about elements in an editable object as maintained by any of the above methods, comprising: determining the retrieval scope of elements in the editable object; obtaining retrieval conditions; retrieving the originality-related information about the elements maintained in association with the elements according to the retrieval scope and retrieval conditions; and returning the retrieval results.

In a further aspect of the present invention, there is provided a method of presenting the originality-related information about elements in an editable object as maintained by any of the above methods, comprising: presenting an element in the editable object in a user interface; retrieving the originality-related information about the element maintained in association with the element; and presenting in the user interface the originality-related information in association with the element.

In still a further aspect of the present invention, there is provided a method of determining the compliance of an element in an editable object with an policy based on the originality-related information about the element as maintained by any of the above methods, comprising: receiving a query for the compliance of the element in the editable object with a predefined policy; retrieving the originality-related information about the element maintained in association with the element; determining the compliance of the element with the policy based on the originality-related information about the element; and returning results indicating the compliance or non-compliance of the element with the policy.

In an another aspect of the present invention, there is provided a method for a first user to provide the repository as recited above to a second user.

In still another aspect of the present invention, there is provided a method for a first user to provide certificates of originality for a second user for editable objects whose data is stored in the repository as recited above.

In yet another aspect of the present invention, there is provided a system for maintaining the originality-related information about elements in an editable object, comprising: an editing event monitor for determining that an element has been edited in the editable object; an originality-related information collector for identifying the originality-related information about the element; and an originality-related information recorder for recording the originality-related information in association with the element.

The originality-related information may comprise the element's creator and one or more of the following: the element's owner; the element's importer; the element's origin; the element's editing method; access rights to the element; certificate of originality of the element; and relevant date and time information.

The editing event monitor may further comprise means for determining the method by which the element has been edited in the editable object, wherein the method by which the element has been edited in the editable object comprises any one of the following: inputting the element from the user editing the editable object; deleting an existing element; modifying an existing element; importing; reference; inheritance; and direct manipulation of the stored version of the editable object.

The originality-related information collector may further comprise: an originality-related information analyzer for automatically identifying the originality-related information about the element according to the method by which the element has been edited in the editable object; and a manual-input information collector for obtaining the originality-related information about the element interactively from the user editing the editable object.

The originality-related information analyzer may be configured for: obtaining the originality-related information about the element in the editable object by extracting the originality-related information already associated with the element and adding the user information of the user editing the editable object as the importer information and the importing operation information in the case that the element has been edited in the editable object by importing, reference, or inheritance; and obtaining the originality-related information about the element from the user information of the user editing the editable object and the editing operation information in the case that the element has been edited in the editable object by inputting from the user editing the editable object, deleting an existing element, modifying an existing element, or direct manipulation of the stored version of the editable object.

The system for maintaining the originality-related information about elements in an editable object may further comprise an editor for editing the editable object, wherein the editor is configurable for deleting an existing element in the editable object by adding a new element the same as the existing element but with a negative sign appended thereto, and configurable for modifying an existing element in the editable object by deleting the existing element in the above manner and then adding a new element with the modifications; and the originality-related information analyzer is configured for, when the editor has deleted an existing element in the editable object by adding a new element the same as the existing element but with a negative sign appended thereto, obtaining the originality-related information about said new element with a negative sign from the user information of the user editing the editable object and the deleting operation information, and when the editor has modified an existing element in the editable object by deleting the existing element in the above manner and then adding a new element with the modifications, obtaining the originality-related information about said new element with a negative sign and said new element with the modifications from the user information of the user editing the editable object and the modifying operation information.

Alternatively, the system for maintaining the originality-related information about elements in an editable object further comprises an editor for editing the editable object, wherein the editor is configurable for deleting an existing element in the editable object by marking the existing element as deleted, and for modifying an existing element in the editable object by deleting parts of the existing element and/or adding parts into the existing element; and wherein the originality-related information analyzer is configurable for, when the editor has deleted an existing element by marking the existing element as deleted, obtaining the originality-related information about the deleted element from the user information of the user editing the editable object and the deleting operation information, and when the editor has modified an existing element by deleting parts of the existing element and/or adding parts into the existing element, treating said deleted and/or added parts of the existing element as new deleted and/or added elements and obtaining the originality-related information about these new deleted and/or added elements in the above manners.

The originality-related information recorder may be configured for embedding the originality-related information in the same editable object or storing the originality-related information in an attached file.

The system for maintaining the originality-related information about elements in an editable object may further comprise a repository (e.g., a database) in which the originality-related information is stored in association with the element, and configurable to be shared by different editable objects and users and configurable to be queried for elements and originality-related information in association. Said storing the originality-related information in association with the element means either storing both the originality-related information and the element in association in the repository, or when storing the originality-related information alone in the repository and storing the corresponding element in another repository or any other storing space, maintaining the association between the originality-related information and the corresponding element. Otherwise, during later querying, the correspondence between the originality-related information and the corresponding element could not be realized.

The system for maintaining the originality-related information about elements in an editable object may further comprise a signature module for digitally signing "across" the association between the element and the originality-related information and/or for digitally signing "across" the association between the element and the originality-related information and the editable object.

The system for maintaining the originality-related information about elements in an editable object may further comprise an authentication module for authenticating the user editing the editable object.

The system for maintaining the originality-related information about elements in an editable object may be further configured for preserving the association between the originality-related information about the element and the element when the element is reused in the future.

The editor may be further configured for setting originality-related information based restrictions by the user editing the editable object, wherein notification/alerts are posted if one or more of the restrictions are violated when an element is edited in the editable object.

The editable object may be computer program code, and the element is any one of a line, a function, a construct, a procedure, a subprogram, and a block of code as specified by the user.

The editable object may be any one of a multimedia file and a database and the element is a natural component thereof or any part thereof as specified by the user.

In an another aspect of the present invention, there is provided an apparatus for retrieving the originality-related information about elements in an editable object as maintained by any of the above methods of, comprising: an identifying module for identifying the retrieval scope of elements in the editable object; an obtaining module for obtaining retrieval conditions; a retrieval module for retrieving the originality-related information about the elements maintained in association with the elements according to the retrieval scope and retrieval conditions; and a returning module for returning the retrieval results.

In still another aspect of the present invention, there is provided an apparatus for presenting the originality-related information about elements in an editable object as maintained by any of the above methods, comprising: an element presenting module for presenting an element in the editable object in a user interface; an originality-related information retrieving module for retrieving the originality-related information about the element maintained in association with the element; and an originality-related information presenting module for presenting in the user interface the originality-related information in association with the element.

In a further aspect of the present invention, there is provided an apparatus for determining the compliance of an element in an editable object with specified policies based on the originality-related information about the element as maintained by any of the above methods, comprising: a query receiving module for receiving a query for the compliance of the element in the editable object with a predefined policy; an originality-related information retrieving module for retrieving the originality-related information about the element maintained in association with the element; a compliance determination module for determining the compliance of the element with the policy based on the originality-related information about the element; and a results returning module for returning determination results indicating the compliance or non-compliance the element with the policy.

In yet another aspect of the present invention, there is further provided a machine readable storage apparatus, having stored thereon a computer program having a plurality of code sections executable by a machine for causing the machine to perform the steps of any one of the above methods.

With the present invention, developers can not only quickly find the owner of an element and seek for assistance or assurance of freedom from contamination, but also mitigate the misuse of third parties' intellectual properties.

The invention is directed to a method and system for maintaining the originality-related information about elements in an editable object. In the following description, numerous specific details are set forth to provide a more thorough description of presently preferred embodiments of the present invention. It is apparent, however, to one skilled in the art that the invention may be practiced without some of these specific details, and/or with various additions or modifications made in said details. In some instances, certain well-known features have not been described in detail so as to not obscure the more relevant and inventive aspects of the invention, it being understood, however, that these well-known features omitted may be necessary for practicing the present invention.

Referring now to FIG. 1A, there is illustrated a system 100 for maintaining the originality-related information about elements in an editable object according to a preferred embodiment of the present invention. As shown, the system 100 comprises an editing event monitor 103 for determining that an element has been edited in the editable object; an originality-related information collector 104 for identifying the originality-related information about the element; and an originality-related information recorder 105 for recording the originality-related information in association with the element.

In a further embodiment of the present invention, the editing event monitor 103 further comprises means 113 for determining the method by which the element has been edited in the editable object.

In a further embodiment of the present invention, the originality-related information collector 104 further comprises an originality-related information analyzer 114 for automatically identifying the originality-related information according to the method by which the element has been edited in the editable object; and a manual-input information collector 124 for obtaining the originality-related information interactively from the user.

Figure 1B:
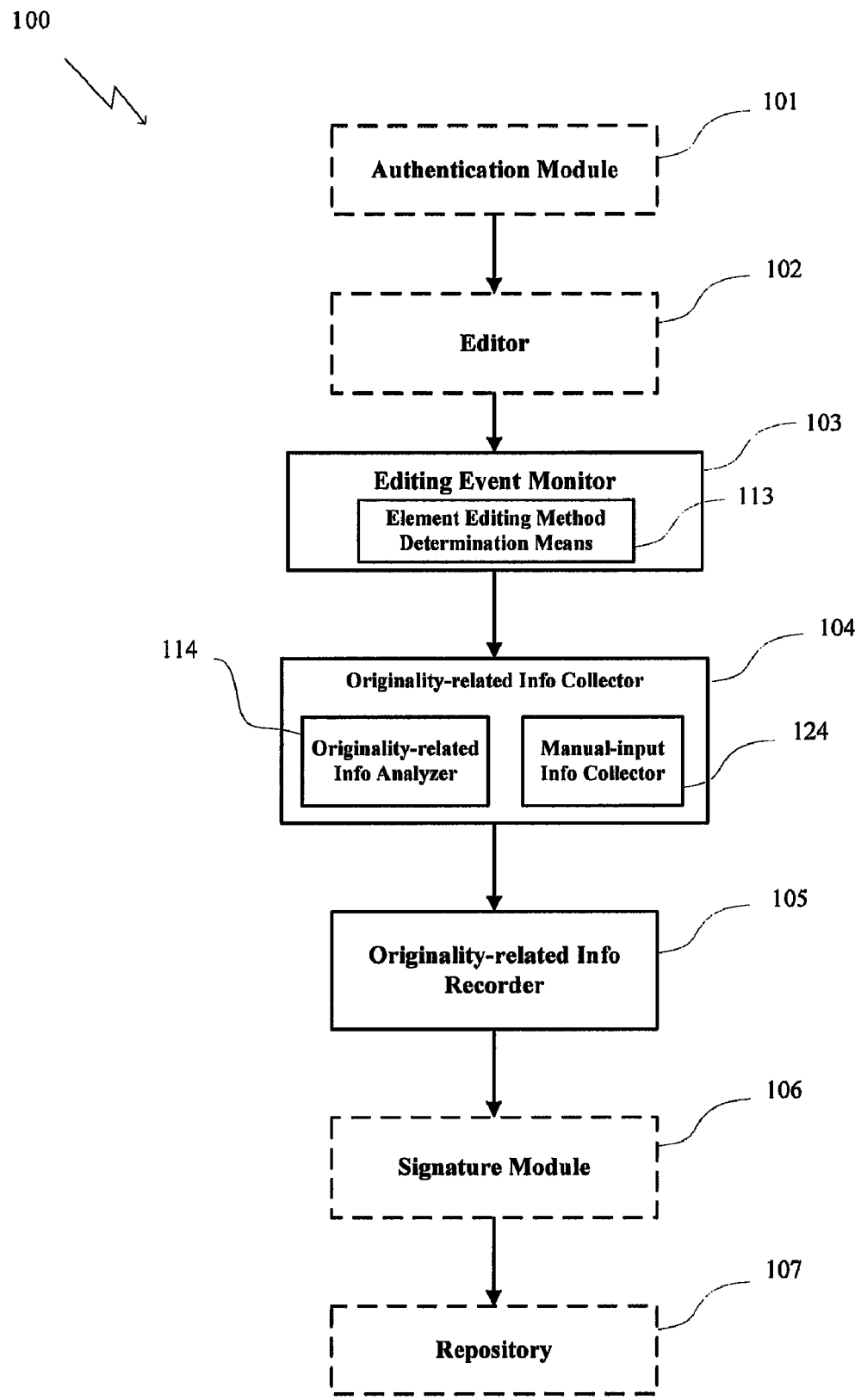
FIG. 1B a schematic block diagram of a system for maintaining originality-related information about elements in an editable object in accordance with further embodiments of the present invention.

FIG. 1B illustrates a system 100 for maintaining the originality-related information about elements in an editable object according to still further embodiments of the present invention. As shown, in further embodiments of the present invention, apart from the editing event monitor 103, the originality-related information collector 104, and the originality-related information recorder 105, the system 100 may further comprise an editor 102 for editing an editable object, the an authentication module 101 for authenticating the user editing the editable object, a signature module 106 for receiving a digital signature resulting from digitally signing the element and for receiving originality-related information in association, and a repository 107 for storing the originality-related information and the element in association as well as for storing the digital signature received through use of the signature module 106.

Among the above components of the system 100, the editor 102 may be a standard editor, such as Eclipse Java Editor, used in software development environment or multimedia file authoring and editing environment or other environment, or an editor specially adapted to implement the present invention. The editor 102 has a user interface (not shown) for interacting with the user, including receiving the editing actions from the user and displaying the contents of the object being edited and the originality-related information about the elements of the object and other relevant information generated during the editing process.

The authentication module 101, the editing event monitor 103, the originality-related information collector 104, the originality-related information recorder 105, and the signature module 106 may be either integral parts of the editor 102, or separate modules connected with the editor 102 (e.g., as plug-ins).

The repository 107 may be in the same computer system as the editor 102, in a server, or in a standalone storage connected to the server in a network environment and thus sharable among different users at different computer systems.

It should be noted that some of the above components may be absent from the system 100 in certain embodiments of the present invention without departing from the scope and spirit of the invention.

In the present context, the editable object refers to any object that can be edited and comprises various parts (referred to as elements herein), such as computer program code, a multimedia file, or a database, etc. Therefore, the present invention is applicable to a computer program development environment, a multimedia file authoring and editing environment, a database creation and maintenance environment, etc.

For a computer program development environment, an element of a program code file can be a line of code, a function, a construct, a procedure, a subprogram, or any block of code as preconfigured or dynamically specified by the user.

For a multimedia file authoring and editing environment, an element of an editable multimedia file can be any discrete part of the multimedia file that can be added, deleted, or otherwise modified by the user, such as text, graphics, music data, etc. Multimedia files, in the present context, include textual documents, web pages, video files, audio files, graphical files, and multimedia files in the strict sense.

For a database creation and maintenance environment, an element of a database can be a constituent element of the database at various levels such as a record, a table, etc.

In the present invention, the elements of an editable object for which originality-related information is to be collected and maintained can be fine-grained; that is, the elements of an editable object can be preconfigured or dynamically specified by the user arbitrarily. In this way, different parts of an editable object which were created by different authors or came from different sources can have their different originality-related information recorded and maintained.

In the present context, the originality-related information refers to the information about an element of an editable object that relates to the origination and subsequent use and transfer of the element and therefore bears upon the responsibilities and rights of the relevant parties. The originality-related information about an element comprises the element creator, that is, who originally wrote the element (author), and at least one information item selected from:

(1) the element's owner (i.e., who owns the element, because sometimes the creator's employer rather than the creator herself have intellectual property rights over the element);

(2) the element's importer (i.e., who added the element into the editable object during an editing process);

(3) the element's origin (i.e., where the element came from—e.g., with a computer program, whether any part of the program's code is from the Open Source, whether the element is from some patents or standards);

(4) the element's editing method (i.e., how the element has been edited—e.g., cut-and-pasted, copied-as-file, typed-in);

(5) access rights to the element (i.e., with a multimedia file, whether the file contains any content whose access is either prohibited (e.g., illegally copied music) or restricted (e.g., using a trademarked logo after one's access rights have expired));

(6) usage rights to the element (e.g., "user XYZ can use the given element 5 times," or "user XYZ can use the element until Oct. 20, 2010); and (7) the date and time information relating to the element's creation, using, etc.

In one embodiment, the at least one information item comprises at least two of said information items (1)-(7).

In one embodiment, the at least one information item comprises at least three of said information items (1)-(7).

In one embodiment, the at least one information item comprises at least four of said information items (1)-(7).

In one embodiment, the at least one information item comprises at least five of said information items (1)-(7).

In one embodiment, the at least one information item comprises at least six of said information items (1)-(7).

In one embodiment, the at least one information item comprises all seven of said information items (1)-(7).

Figure 2:
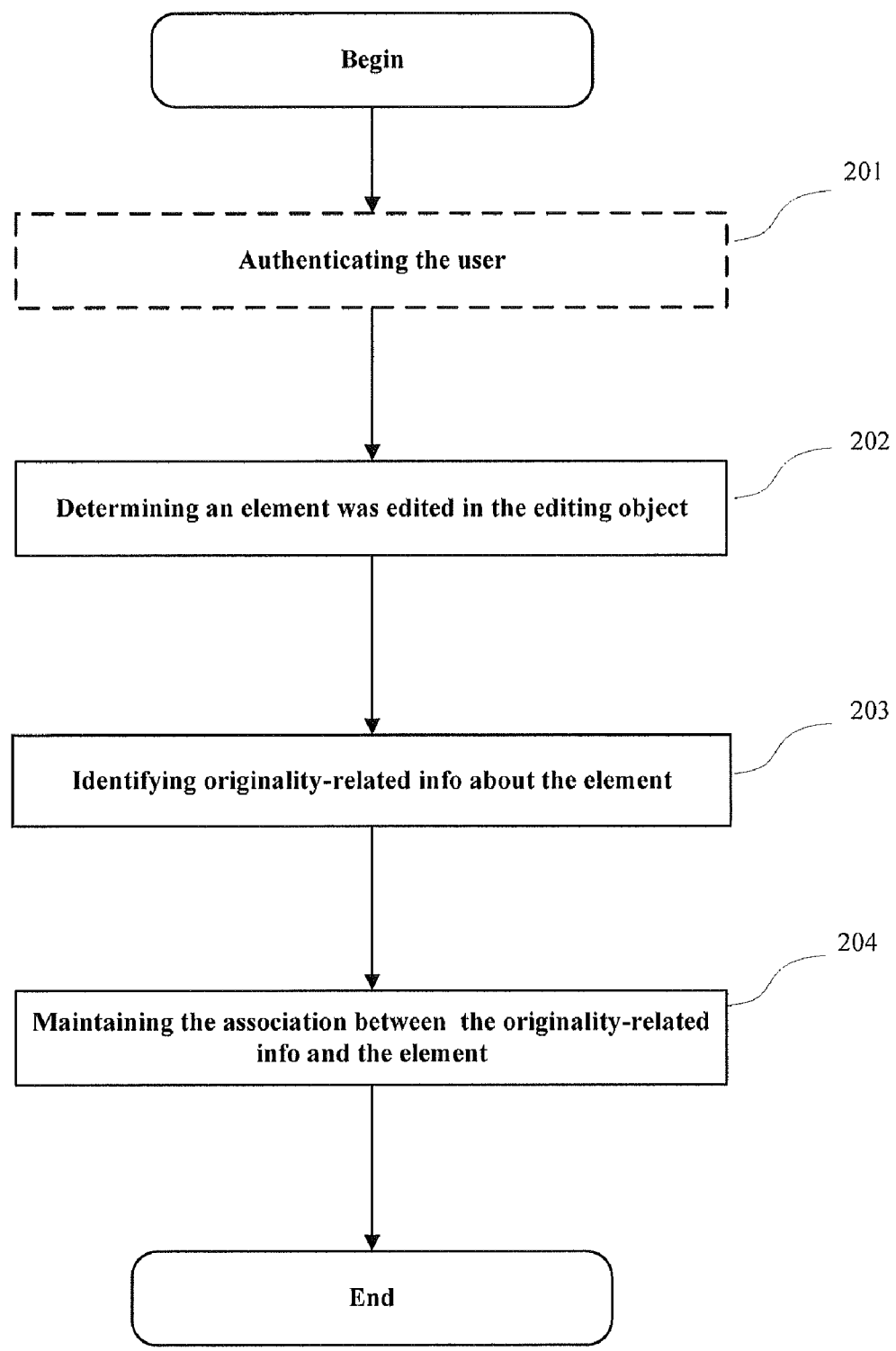
FIG. 2 is a schematic flow chart illustrating a method for maintaining originality-related information about elements in an editable object in accordance with preferred embodiments of the present invention.

The operations of the system 100 and its various components will be described in detail below in connection with a method for maintaining the originality-related information about elements in an editable object in accordance with preferred embodiments of the present invention as shown in FIG. 2. It should be noted, however, that the method for maintaining the originality-related information about elements in an editable object of the present invention can also be implemented in a system with different components from those of the system 100, as long as the steps of the method for maintaining the originality-related information about elements in an editable object of the present invention are performed. For ease of illustration, the following description is presented mainly in connection with an example from program development environment, it being understood, however, that the system and method of the present invention applies equally to other environments such as those of multimedia file authoring and editing, and database creation and maintenance.

As shown in FIG. 2, after beginning, the process proceeds to step 201, where the user logins to the editor 102 through the authentication module 101 to link the user with the object being edited, say certain computer program code; in the embodiments of the present invention where the identity of the user editing the object need not be verified, the process can do without the authentication step. There are many standard ways to perform authentication, such as User/Password, Kerberos, Needham-Schroeder, PKI, etc, which are well-known in the art and will not be further described here. After the authentication, when the user performs editing actions on the program code as needed, the editing event monitor 103 monitors the editing actions in step 202, determining that an element has been edited such as a line has been added to the program code, and determining through the element editing method determination means 113 the method by which the line has been added to the program code, such as typing text, copy-or-cut-and-pasting, etc.

In the present invention, there are various editing methods by which an element can be edited in an editable object, which are dependent on the type of the object being edited, but which can be generally classified into two categories: a first category of editing methods which include those methods by which an element is originally created or edited in the object being edited; and a second category of editing methods which include those methods by which an element already created is introduced into the object being edited from an outside source.

The first category of editing methods include: inputting an element through a user input device by the user editing the object, such as typing a new line of code in a program code file during program development through a keyboard, drawing an image in a graphical file with a stylus, or recording a new piece of audio or video in a multimedia file through a microphone or a digital video camera attached to a computer system, etc.; deleting or modifying an existing element in the editable object by the user editing the object, the term modifying here shall be understood either as modifying the content or the format of the editable object; and direct manipulation of the stored version of the editable object (e.g., modification of the disk file containing the editable object by a bit-level editor).

The second category of editing methods include importing an element from an outside source, such as copy-or-cut-and-pasting a block of code into a program code file from a file in another program development project, copy-or-cut-and-pasting or inserting an image into a multimedia file from the Internet, attaching a image file, an audio or video file into a multimedia file etc.; reference (e.g., to a java library from a computer program, or to a person, place from a verse in a song, or linking to an external object from a document); and inheritance (e.g., using a Java class that is an extension of an existing Java class).

A current problem is that, because the elements of an editable object may be edited by multiple authors, if an element added by a previous author is deleted by a later author, this element and its originality-related information would be lost. If an element added by a previous author is modified by a later author, the element would lose its association with the previous author and the previous originality-related information. Thus the history of editions of the editable object could not be traced. To address this problem, in a first embodiment of the present invention, the editor 102 is adapted to adopt a monotonic editing method, in which, using program code as an example, if a line is added, the new line is simply added, and the originality-related information is recorded as described below; if a line is deleted, the line and its previous originality-related information remain untouched, and a new line the same as the line being deleted but with a negative sign is added to counteract the original line, and the originality-related information in association with this new line is recorded as described below; and if a line is modified in some parts, this operation will be treated as two successive operations: first the line being modified is deleted in the above manner, then a new line with the modifications is added, and the originality-related information in association with this new line is recorded as described below. Note that the line can be defined according to the nature of the editable object and the requirements of the user. With this monotonic editing method, all the editing operations, including deletion and modification, will be treated as a kind of addition. In this way, the history of editions of an editable object during its whole lifecycle can be retained, no author can eliminate any other author's editions and information, and those who are responsible for which parts of the editable object is clearly maintained.

In a second embodiment of the present invention, the editor 102 is configurable for deleting an existing element in an editable object by marking the element as deleted, wherein the originality-related information of this deleted element will be obtained and maintained in a manner as described below, and the editor 102 is also configurable for modifying an existing element in an editable object by deleting some parts of the element and/or adding some other parts into the element, wherein these deleted and/or added parts of the element will be treated as new deleted and/or added elements, and the originality-related information of them will be obtained and maintained in manners as described below.

Returning to FIG. 2, after determining in step 202 that a line has been added to the program code, and determining the method by which the line has been added to the program code, the editing event monitor 102 triggers the originality-related information collector 104, which, in step 203, identifies the originality-related information about the line. Specifically, the originality-related information analyzer 114 within the originality-related information collector 104 automatically determines the originality-related information about the element based on the method by which the element has been edited in the editable object as determined by the editing event monitor 103 and provides this information to the subsequent steps. If it has been determined by the editing event monitor 103 that the author was typing some new code line, the originality-related information analyzer 114 will note the code line as originated by the current author, and obtain the originality-related information about the code line from the user information as retrieved from the computer system, the authenticity of the user information having been ensured by the authentication step 201. In the first embodiment of the present invention, if the author was deleting or modifying a code line, the originality-related information analyzer 114 will keep the original line and its originality-related information untouched, note the newly added-line with the negative sign and the newly added-line with modifications as originated by the current author, and obtain the originality-related information about the newly-added lines from the user information as retrieved from the computer system and the deleting or modifying operation information (e.g., operation type, operation time etc.).

In the second embodiment of the present invention, if the author was deleting or modifying a code line, the originality-related information analyzer 114 will keep the original line's originality-related information untouched, and treat the newly deleted code line or deleted or added parts of the code line as new elements originated by the current author, and obtain the originality-related information about these new elements from the user information as retrieved from the computer system and the deleting or adding operation information. If the author was directly modifying the stored version of the editable object, the originality-related information analyzer 114 will also note the modified parts as originated by the current author, and obtain the originality-related information about the modified parts from the user information as retrieved from the computer system and the modifying operation information.

On the other hand, if it has been determined by the editing event monitor 103 that the author was copy-or-cut-and-pasting some lines from another author's code, or the element was added to the editable object by inserting, attaching, reference or inheritance, and these lines or element has already had the associated originality-related information, the originality-related information analyzer 114 will automatically obtain the originality-related information from the code lines or element itself, and simply add the current author's information as the importer information and add the importing operation information, e.g., obtaining the originality-related information from the code lines or element that was previously developed according to the present invention and so have the associated originality-related information, or obtaining the originality-related information from the author tag of a DTD reference, or from a copyright indicator in the element's parent Java class, or by identifying a logo of trademark or proprietary content within the element.

In addition, the current author can further manually input additional originality-related information, e.g., whether the current author copied a portion of Open Source code under certain licensing terms, or if the current author used some ideas from some patents or standards, or access rights or usage rights to the element, through the manual-input information collector 124. Any information considered by the author as conducive to the maintenance of the code lines can be inputted as the additional originality-related information.

Next, in step 204, the association between the originality-related information as identified by the originality-related information collector in step 203 and the element is maintained. This step comprises the originality-related information recorder 105 embedding the originality-related information about the element in the same editable object, in which case the originality-related information can be periodically archived and only links to the archive are left in the editable object to keep the size of the editable object from growing too big; or the originality-related information recorder 105 storing the originality-related information in association with the element in an attached file. Alternatively or additionally, the originality-related information recorder 105 can also store the originality-related information and the element in association in a repository which can be shared by different editable objects and users and can be queried for elements and originality-related information in association, including any and all of the known originality-related information of a given element, or any and all elements with given originality-related information. In a computer program development environment, the originality-related information can also be versioned by the same SCM used to version the program code.

In one embodiment of the present invention, in accordance to the company's policy, the author can choose whether to digitally sign the element and the originality-related information in association, in order to ensure the integrity and non-repudiation of the element and its association with the originality-relation information. The digital signature should be "across" the association between the element and the originality-related information, that is, the signature should include some rendering, like a checksum, of the association's data, namely the element and the originality-related information, so that it can verify both the association (i.e., that the given element and the originality-related information are, in fact, associated), as well as both the content of the element and the originality-related information. As such, if the element is tampered with without being recorded by the editing system, e.g., when someone opens said object by a method other than that described in the present invention to edit it (e.g., opens it in another editor), the originality-related information may not be recorded. In this case, the digital signature technique can be used to ensure warning the current tamperer or later visitors of the object, notifying that the object may be tampered with without recording the originality-related information. The present invention will make future project management such as COO simpler, because once an element is found to have been tampered with, the content in the COO may not be credited.

In this way, when the element is reused in other projects, the corresponding originality-related information will accompany it, so the originality-related information can be utilized by the latter user, and still be kept in the newly developed editable object. Thus, the consistence of the originality-related information is ensured during element reuse.

In some cases, not only the association between an element and its originality-related information, but also the association between an element and its originality-related information and the whole editable object should be ensured. For example, in computer program development, after an importer imported a block of code into the current document, and some error occurred, it would be necessary to know not only who created the block of code, but also who imported this block of code into this document, Therefore, in a further embodiment of the present invention, for example, an importer can choose to digitally sign "across" the association between an imported element and the originality-related information (including the importer and importing operation information) and the whole document or the context of the imported element, in order to ensure the integrity and non-repudiation of both the element and its association with the originality-relation information, and its association with the whole document.

Figure 3:
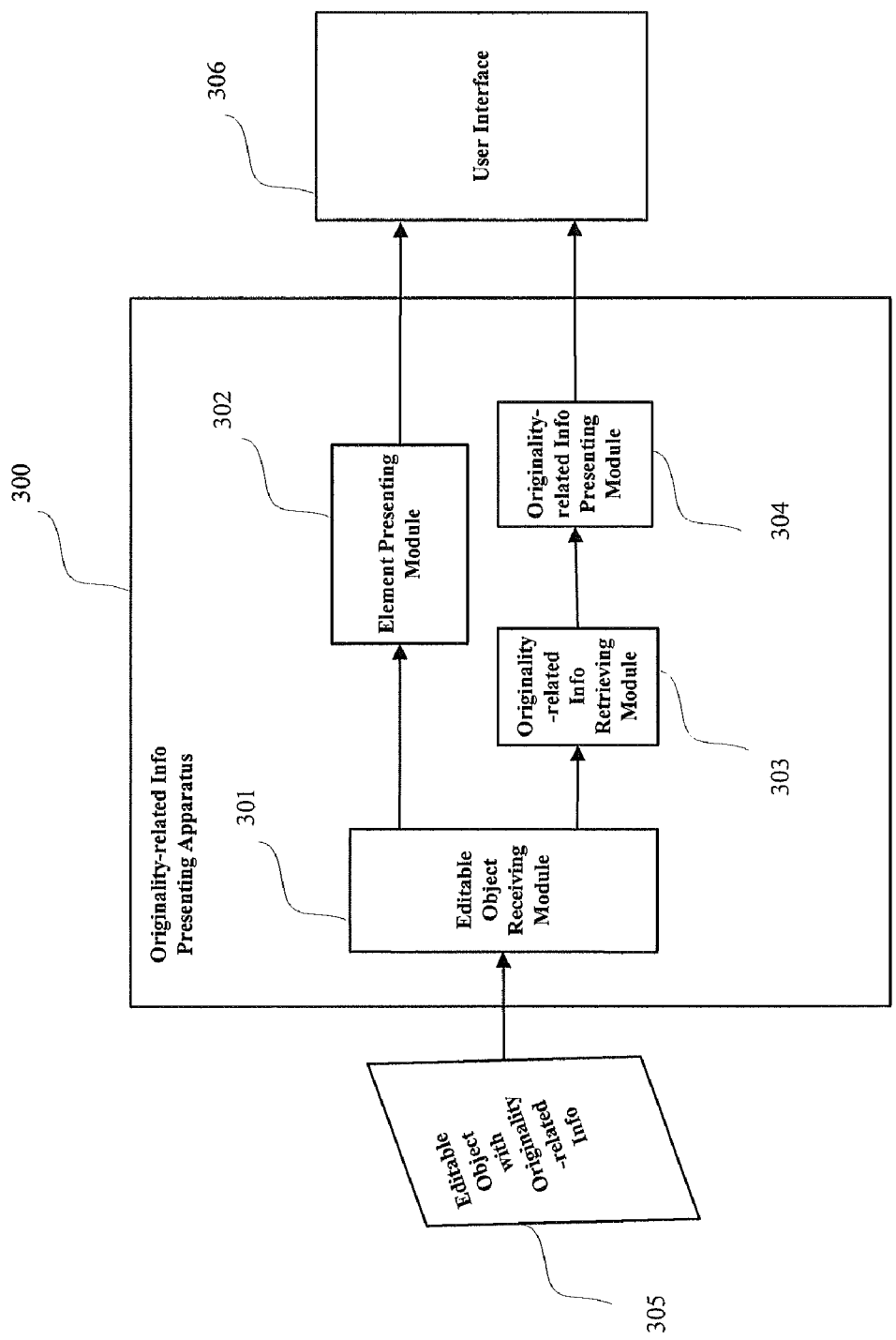
FIG. 3 is a schematic block diagram of an apparatus for presenting originality-related information about elements in an editable object according to a further aspect of the present invention.

In a further aspect of the present invention, there is also provided an apparatus and method of presenting the originality-related information about elements in an editable object as maintained by the above described methods of the present invention. As shown in FIG. 3, the apparatus 300 for presenting the originality-related information about elements in an editable object according to an embodiment of the present invention comprises an editable object receiving module (which is optional) 301 for receiving an editable object 305 with the originality-related information; an element presenting module 302 for presenting an element in the editable object in a user interface 306; an originality-related information retrieving module 303 for retrieving the originality-related information about the element maintained in association with the element; and an originality-related information presenting module 304 for presenting in the user interface 306 the originality-related information in association with the element.

It should be noted that the apparatus 300 for presenting the originality-related information about elements in an editable object can either be integrated with the system 100 for maintaining the originality-related information about elements in an editable object of the present invention, in which case, some of the components of the apparatus 300, in particular, the editable object receiving module 301 and the element presenting module 302, will preferably be common to both the apparatus 300 and system 100, e.g., as integral components of the editor 102, and in which case, the apparatus 300 is used in the process of maintaining the originality-related information about elements in an editable object of the present invention, and actually constitutes a kind of presenting means of the system 100 of the present invention; or alternatively, the apparatus 300 can be a standalone apparatus, which is used specifically for presenting the originality-related information about elements in an editable object which was already maintained by a system 100 of the present invention.

Figure 4:
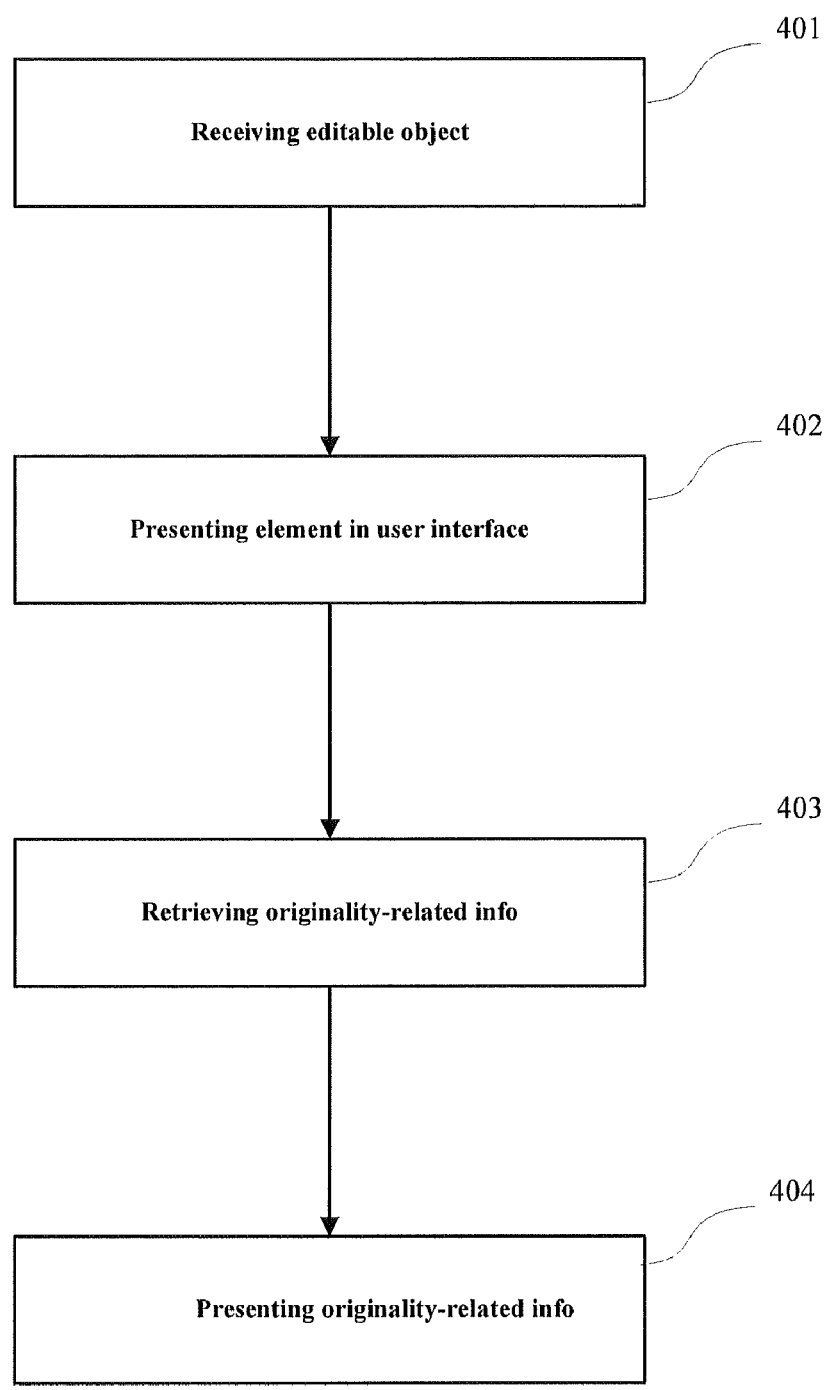
FIG. 4 is a schematic flow chart illustrating a method of presenting originality-related information about elements in an editable object according to a further aspect of the present invention.

The operations of the apparatus 300 and its various components will be described below in connection with the method of presenting the originality-related information about elements in an editable object of the present invention as shown in FIG. 4. It should be noted, however, that the method for presenting the originality-related information about elements in an editable object of the present invention can also be implemented in an apparatus with different components from those of the apparatus 300, as long as the steps of the method for presenting the originality-related information about elements in an editable object of the present invention are performed.

As shown, in step 401 (which is optional), the editable object receiving module 301 receives an editable object 305 with associated originality-related information, which was maintained in the above described methods of maintaining the originality-related information about elements in an editable object according to embodiments of the present invention and stored in the same editable object or in an attached file. Then, in step 402, the element presenting module 302 presents an element in the editable object 305 received by the editable object receiving module 301 in a user interface 306. And in step 403, the originality-related information retrieving module 303 retrieves the originality-related information about the element maintained in association with the element from the editable object 305 or an attached file, and passes the originality-related information to the originality-related information presenting module 304. And finally, in step 404, the originality-related information presenting module 304 presents the originality-related information in the user interface 306 in association with the element already presented. The originality-related information can be presented by any method understood by the person skilled in the art, such as by populating a list of originality-related information when user clicks the element, or by displaying the originality-related information in another window beside the element presenting window, etc.

Figure 5:
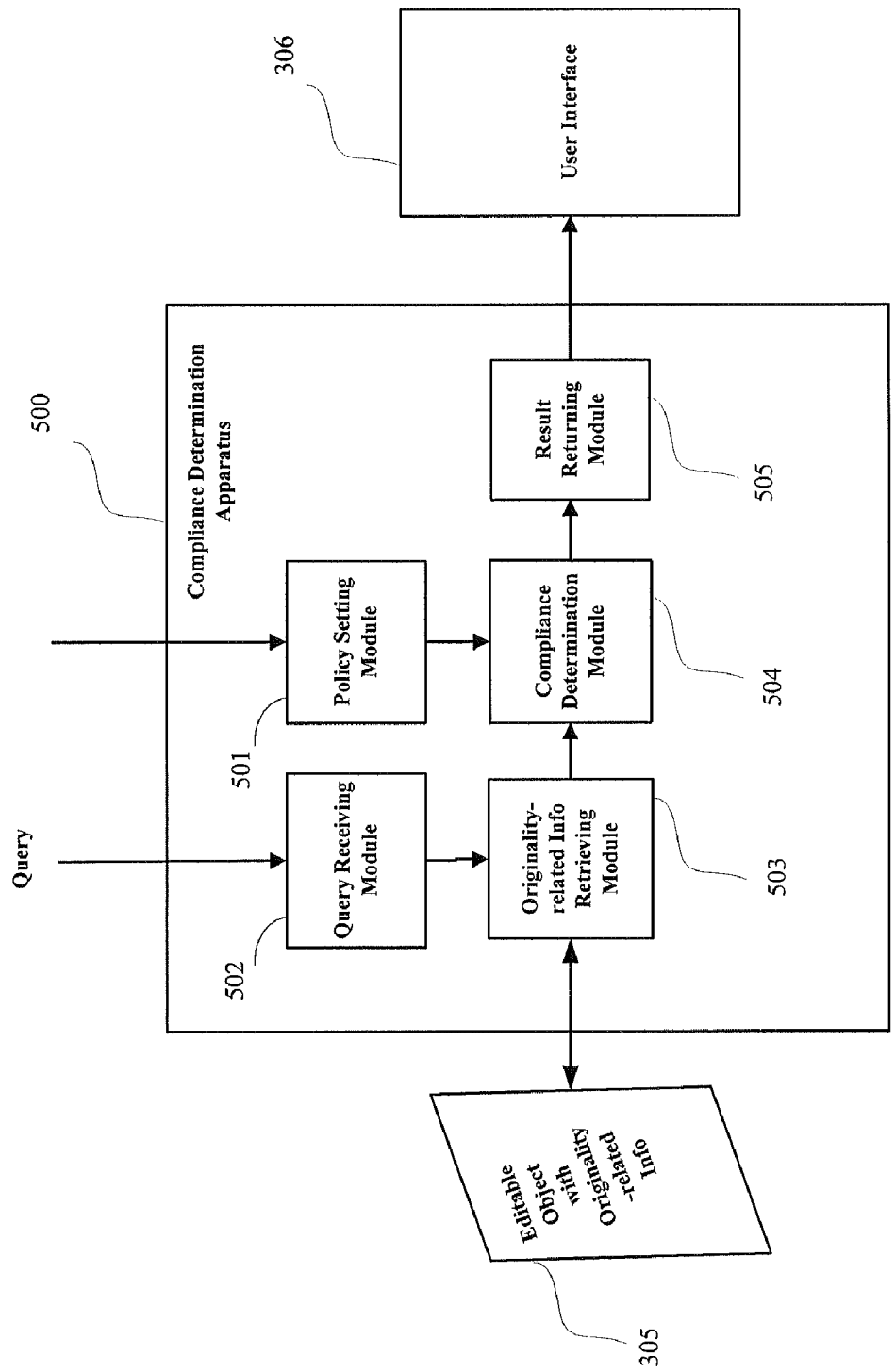
FIG. 5 is a schematic block diagram of an apparatus for determining compliance of an element in an editable object with a policy according to a further aspect of the present invention.

In still a further aspect of the present invention, there is also provided an apparatus and method of determining the compliance of an element in an editable object with a policy based on the originality-related information about the element as maintained by the above describe methods of the present invention. As shown in FIG. 5, the apparatus 500 for determining the compliance of an element in an editable object with a policy according to an embodiment of the present invention comprises: policy setting module 501 for setting an originality-related information based policy regarding elements of the editable object; a query receiving module 502 for receiving a query for the compliance of the element in the editable object with the predefined policy; an originality-related information retrieving module 503 for retrieving the originality-related information about the element maintained in association with the element; a compliance determination module 504 for determining the compliance of the element with the policy based on the originality-related information about the element; and a determination results returning module 505 for returning determination results indicating the compliance or non-compliance of the element with the policy.

It should be noted that the apparatus 500 for determining the compliance of an element in an editable object with a policy of the present invention can either be integrated with the system 100 for maintaining the originality-related information about elements in an editable object of the present invention, in which case, the apparatus 500 is used in the process of maintaining the originality-related information about elements in an editable object of the present invention, and preferably in the editable object editing environment for ensuring that elements to be added into the editable object comply with the policy; or alternatively, the apparatus 500 can be a standalone apparatus, which is used specifically for determining the compliance of elements in an editable object with the predefined policies.

Figure 6:
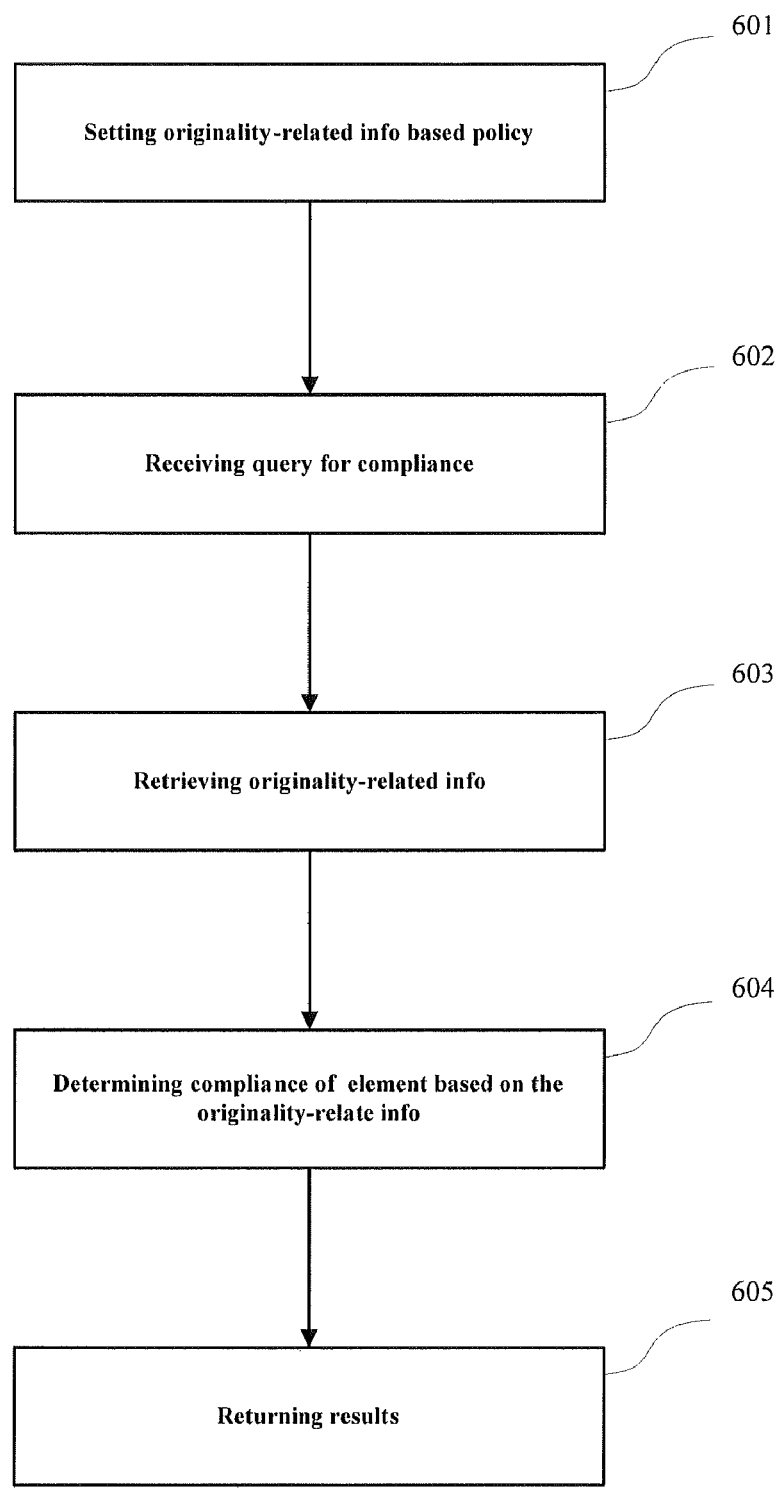
FIG. 6 is schematic flow chart illustrating a method of determining compliance of an element in an editable object with a policy according to a further aspect of the present invention.

The operations of the apparatus 500 and its various components will be described below in connection with the method of determining the compliance of an element in an editable object with a policy based on the originality-related information about the element according to an embodiment of the present invention as shown in FIG. 6. It should be noted, however, that the method of determining the compliance of an element in an editable object with a policy based on the originality-related information about the element of the present invention can also be implemented in an apparatus with different components from those of the apparatus 500, as long as the steps of the method of determining the compliance of an element in an editable object with a policy based on the originality-related information about the element of the present invention are performed.

As shown, in step 601, a user sets an originality-related information based policy regarding elements of an editable object through the policy setting module 501. The policy can be originality-related information based restrictions set by the user; e.g., "no code from Open Source". At a later time, in step 602, the query receiving module 502 receives a query for the compliance of an element in the editable object with the policy. The query can be explicitly input by the user, or can be posed automatically based on configurations; e.g., every time when an element was added to the editable object. The query can be for the compliance of a specific element in the editable object, or can be for the compliance of some or all of the elements in the editable object, or can be for the compliance of some or all elements from multiple editable object maintained in association with their originality-related information in a repository as described above. Next, in step 603, according to the query, the originality-related information retrieval module 503 retrieves the originality-related information maintained in association with the element from the editable object 305 or an attached file, and passes the originality-related information to the compliance determination module 504. In step 604, the compliance determination module 504 determines the compliance of the element with the policy by comparing the originality-related information of the element against the policy obtained from the policy setting module. And finally, in step 605, the determination results returning module 505 returns the determination results (e.g., to a user) indicating the compliance or non-compliance of the element with the policy, for example, in an integrated editing environment, the editor posts notification/alerts if one or more restrictions are violated by an element being edited in the editable object, thus avoiding violating third parties' intellectual property rights unwittingly or being exposed to other risks.

The present invention can also be implemented as a business method in which a first user provides the repository storing elements and the corresponding originality-related information as described above to a second user, so that the second user can query and retrieve the elements and the corresponding originality-related information; or be implemented as a method in which a first user provides certificates of originality for a second user for editable objects whose data is stored in the repository.

In yet another aspect of the present invention, there is further provided a method for retrieving the originality-related information of elements in an editable object as maintained by any of the above methods of the present invention, comprising: identifying the retrieval scope of elements in the editable object; obtaining retrieval conditions; retrieving the originality-related information about the elements maintained in association with the elements according to the retrieval scope and retrieval conditions; and returning the retrieval results. For example, a user desiring to know whether some program code contains pieces of code inputted by a specific author can retrieve the originality-related information of pieces of code. After the retrieval, the relevant information can be returned to the user. The retrieval results can include but are not limited to the pieces of code inputted by the specific author, etc. The identifying step can identify either a whole editable object as the retrieval scope, or a number of whole editable objects as the retrieval scope, or all of the editable objects in a storage region (e.g., the above mentioned repository) as the retrieval scope, or one or more elements in an editable object as the retrieval scope. Those of ordinary skill in the art will appreciate that the present invention can further include an apparatus or product corresponding to the above method.

Having described above in detail the system and method of maintaining the originality-related information about elements in an editable object, the apparatus and method of presenting the originality-related information about elements in an editable object, and the method related to the repository storing elements and the originality-related information according to embodiments of the present invention, it should be noted the various components of the system and apparatus and the steps of the methods are presented only for illustration purpose and should not be construed as limiting the invention to the precise forms presented. For example, some components of the system and apparatus of the present invention may not be discrete components, but may be combined together, or may be further split, and their interrelation may be different, provided only that the functions performed by these components are realized. Similarly, steps of the methods of the present invention may be in different order, some steps may be omitted, some new steps may be added, without departing from the essential characteristics and principle of the present invention.

One embodiment of the present invention may be implemented using a conventional general purpose or a specialized digital computer or microprocessor(s) programmed according to the teachings of the present disclosure, as will be apparent to those skilled in the art. Appropriate software coding can readily be prepared by skilled programmers based on the teachings of the present disclosure, as will be apparent to those skilled in the art. The invention may also be implemented by the preparation of integrated circuits or by interconnecting an appropriate network of conventional component circuits, as will be readily apparent to those skilled in the art.

One embodiment of the present invention comprises a computer program product which is a storage medium having instructions stored therein which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Figure 7:
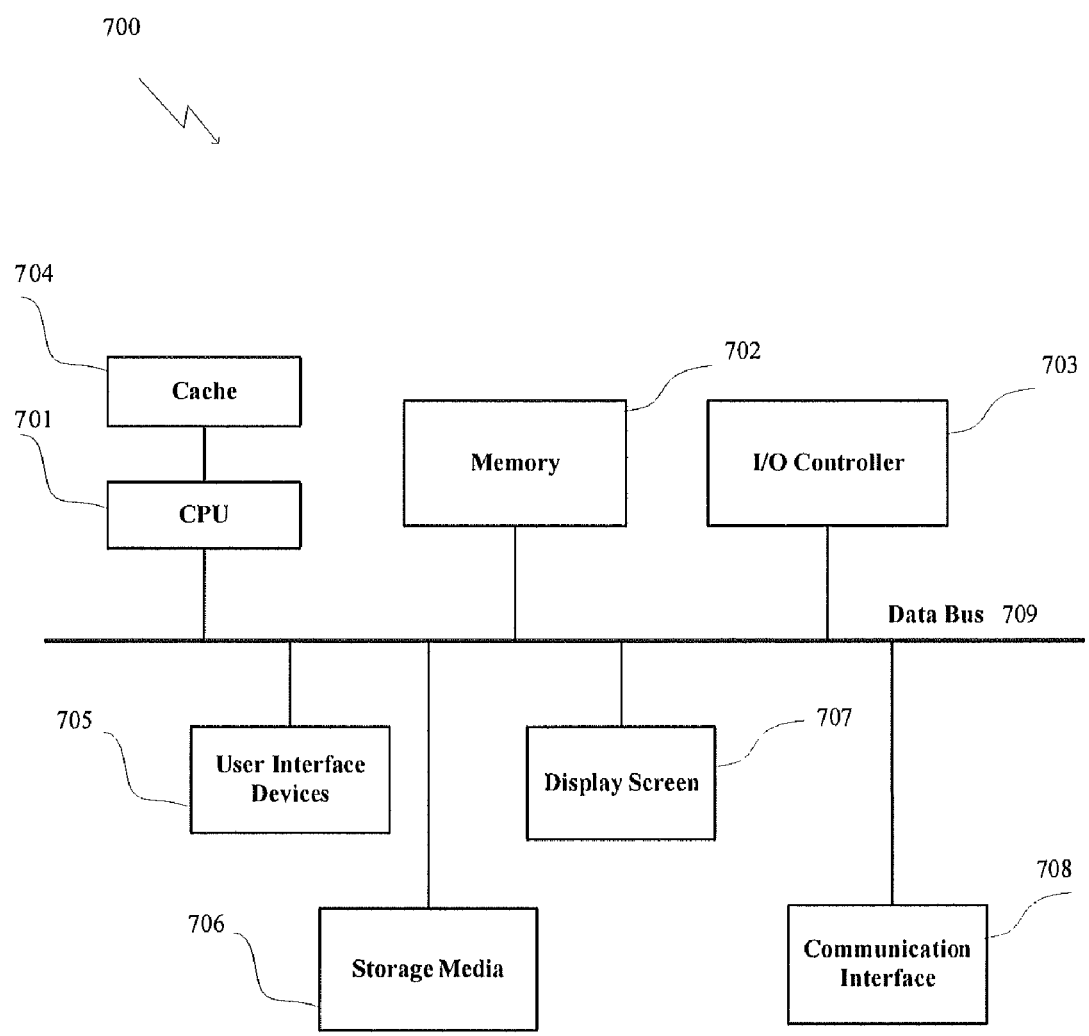
FIG. 7 is a schematic block diagram of a computer system in which the method and system for maintaining the originality-related information about elements in an editable object in accordance with embodiments of the present invention can be implemented.

FIG. 7 shows a general purpose computer system 700 in which the present invention can preferably be implemented. The depicted computer system 700, however, is provided for the purpose of example only. The invention may be practiced with other suitable hardware architectures or environments which may contain more, less or different components. As shown, the system 700 comprises a central processor unit (CPU) 701, main memory 702, input/output controller 703, cache memory 704, user interface devices 705 (e.g., keyboard, mouse, microphone, camera, etc.), storage media 706, display screen 707, communication interface 708 (e.g., a network card, a modem, or an integrated services digital network (ISDN) card, etc.), and system clock (not shown in FIG. 7). One or more input/output devices such as a printing or a scanning device may be included in system 700. A bi-directional system bus 709 provides a mechanism for communication between the system components. The system itself is capable of communicating with other systems through communication interfaces 708. Wireless links are also possible. In any such implementation, communication interface 708 can send and receive electrical, electromagnetic, or optical signals that carry digital data streams representing various types of information.

In such a computer system, storage media 706 generally have software modules of instructions stored therein, which, when being loaded into memory 702 and executed by processor 701, cause the computer system to perform various steps of method of the present invention, thus these software modules, when in execution, are combined with the general hardware components, such as CPU 701, memory 702, user interface devices 705, and display screen 707 etc., of the computer system to form the components of the system and apparatus of the present invention.

Figure 8:
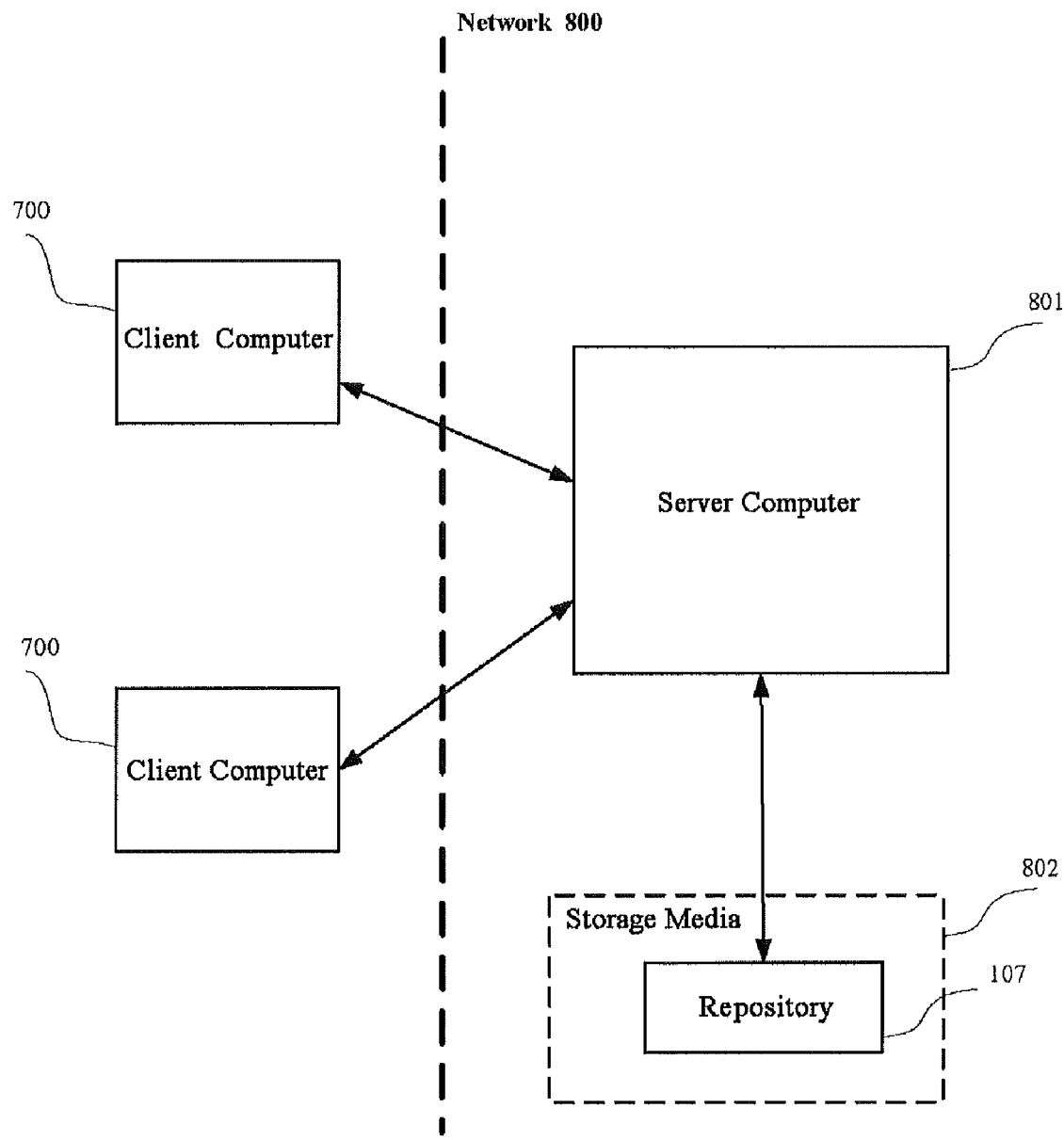
FIG. 8 is a schematic block diagram of a network environment in which the method and system for maintaining the originality-related information about elements in an editable object in accordance with embodiments of the present invention can be implemented.

FIG. 8 shows a client/server network environment 800 in which the present invention may be implemented. This is a typical team work environment within an enterprise, in which each developer works at her own client computer 700 in which the method, system and apparatus of the present invention or part thereof may be implemented, and which may communicate with each other through the server computer 801. The repository 107 for storing elements and the corresponding originality-related information according to the present invention may reside in the storage medium 802 connected to the server computer 801, so that the developers can share their objects conveniently.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the art to understand the invention, and the various embodiments with various modifications that are suited to the particular use contemplated. It is intended that the scope of the invention be defined by the following claims and their equivalents.

What is claimed is:

1. A method for maintaining originality-related information about elements in an editable object, said method comprising:

a processor of a computer system determining that an element has been edited in the editable object;

said processor identifying the originality-related information about the element, wherein the originality-related information comprises a creator of the element who originally wrote the element; and said processor recording the originality-related information, said recording selected from the group consisting of embedding the originality-related information in the editable object, storing the originality-related information in an attached file, and storing the originality-related information in association with the element in a repository configured to be shared by different editable objects and further configured to be queried for elements of the different editable objects in association with originality-related information pertaining to the elements of the different editable objects, wherein the originality-related information further comprises:

an owner of the element who differs from the creator of the element;

an importer of the element who differs from the creator of the element and who added the element into the editable object during an editing process;

an origin of the element, said origin of the element being a source document or portion thereof from which the element originated;

an editing method by which the element has been edited in the editable object;

legal limitations for accessing the element;

a certificate of originality of the element; and date and time information relating to when the element was created.

2. The method of claim 1, wherein said recording comprises embedding the originality-related information in the editable object.

3. The method of claim 1, wherein said recording comprises storing the originality-related information in association with the element in a repository configured to be shared by different editable objects and further configured to be queried for elements of the different editable objects in association with originality-related information pertaining to the elements of the different editable objects.

4. The method of claim 1, wherein the method further comprises determining an editing method by which the element has been edited in the editable object, and wherein the originality-related information comprises the editing method.

5. The method of claim 4, wherein said identifying comprises automatically identifying the originality-related information about the element according to the editing method.

6. The method of claim 5, wherein the editing method comprises importing the element into the editable object, and wherein said importing consists of referencing the element via linkage to an external document or inheriting the element by use of a class that is an extension of an existing class.

7. The method of claim 6, wherein said automatically identifying the originality-related information about the element comprises obtaining the originality-related information about the element in the editable object by extracting the originality-related information already associated with the element and adding user information of a user editing the imported editable object.

8. The method of claim 5,
wherein the element that has been edited was an existing element in the editable object,
wherein the editing method comprises deleting the existing element in the editable object by adding a new element such that the new element is the existing element with a negative sign appended thereto or by adding a new element such that the new element is the existing element with modifications; and
wherein said automatically identifying the originality-related information about the element comprises obtaining the originality-related information about the new element from user information of a user editing the editable object.

9. The method of claim 1, wherein the method further comprises receiving a digital signature resulting from a digital signing of the association between the element and the originality-related information.

10. The method of claim 1, wherein the method further comprises receiving a digital signature resulting from a digital signing across an association between the element and the originality-related information and the editable object.

11. The method claim 1, wherein the method further comprises after said recording:
using the element in a manner that preserves the association between the originality-related information about the element and the element.

12. The method of to claim 1, wherein the editable object is computer program code, and the element is selected from the group consisting of a line of code, a function, a construct, a procedure, a subprogram, and a block of code.

13. The method claim 1, wherein the method further comprises after said recording:
retrieving the element and the originality-related information about the element maintained in association with the element; and
presenting in a user interface the element and the originality-related information in association with the element.

14. A computer system comprising a processor and a computer readable memory unit coupled to the processor, said memory unit containing instructions that when executed by the processor implement a method for maintaining originality-related information about elements in an editable object, said method comprising:
determining that an element has been edited in the editable object;
identifying the originality-related information about the element, wherein the originality-related information comprises a creator of the element who originally wrote the element; and
recording the originality-related information, said recording selected from the group consisting of embedding the originality-related information in the editable object, storing the originality-related information in an attached file, and storing the originality-related information in association with the element in a repository configured to be shared by different editable objects and further configured to be queried for elements of the different editable objects in association with originality-related information pertaining to the elements of the different editable objects,
wherein the originality-related information further comprises:
an owner of the element who differs from the creator of the element;
an importer of the element who differs from the creator of the element and who added the element into the editable object during an editing process;
an origin of the element, said origin of the element being a source document or portion thereof from which the element originated;
an editing method by which the element has been edited in the editable object;
legal limitations for accessing the element;
a certificate of originality of the element; and
date and time information relating to when the element was created.

15. A computer program product, comprising a computer readable storage medium having a computer readable program code embodied therein, said computer readable program code containing instructions that when executed by a processor of a computer system implement a method for maintaining originality-related information about elements in an editable object, said method comprising:
determining that an element has been edited in the editable object;
identifying the originality-related information about the element, wherein the originality-related information comprises a creator of the element who originally wrote the element; and
recording the originality-related information, said recording selected from the group consisting of embedding the originality-related information in the editable object, storing the originality-related information in an attached file, and storing the originality-related information in association with the element in a repository configured to be shared by different editable objects and further configured to be queried for elements of the different editable objects in association with originality-related information pertaining to the elements of the different editable objects,
wherein the originality-related information further comprises:
an owner of the element who differs from the creator of the element;

an importer of the element who differs from the creator of the element and who added the element into the editable object during an editing process;

an origin of the element, said origin of the element being a source document or portion thereof from which the element originated;

an editing method by which the element has been edited in the editable object;

legal limitations for accessing the element;

a certificate of originality of the element; and date and time information relating to when the element was created.

16. A method of assessing compliance of an element in an editable object with a policy, said method comprising:

a processor of a computer system receiving a query for compliance of the element with the policy, wherein the policy relates to originality-related information about the element, and wherein the originality-related information about the element is being maintained in association with the element;

said processor retrieving the originality-related information about the element maintained in association with the element, wherein the element has been edited in the editable object, wherein the originality-related information comprises a creator of the element who originally wrote the element, and wherein said retrieving is selected from the group consisting of retrieving the originality-related information from the editable object in which the originality-related information is embedded, retrieving the originality-related information from an attached file, and retrieving the originality-related information in association with the element from a repository configured to be shared by different editable objects and configured to be queried for elements of the different editable objects in association with originality-related information pertaining to the different editable objects;

said processor assessing whether the element is in compliance with the policy, said assessing based on the retrieved originality-related information about the element; and said processor transmitting a result to a user based on said assessing, said result indicating compliance or non-compliance of the element with the policy, wherein the originality-related information further comprises:

an owner of the element who differs from the creator of the element;

an importer of the element who differs from the creator of the element and who added the element into the editable object during an editing process;

an origin of the element, said origin of the element being a source document or portion thereof from which the element originated;

an editing method by which the element has been edited in the editable object;

legal limitations for accessing the element;

a certificate of originality of the element; and date and time information relating to when the element was created.

* * * * *